(12) United States Patent
Cohen et al.

(10) Patent No.: US 8,634,301 B2
(45) Date of Patent: Jan. 21, 2014

(54) METHOD AND SYSTEM OF RESTORING FLOW OF TRAFFIC THROUGH NETWORKS

(75) Inventors: Reuven Cohen, Haifa (IL); Gabi Nakibly, Kiryat Bialik (IL)

(73) Assignee: Technion Research & Development Foundation Limited, Haifa (IL)

( * ) Notice: Subject to any disclaimer, the term of this patent is extended or adjusted under 35 U.S.C. 154(b) by 515 days.

(21) Appl. No.: 12/423,636

(22) Filed: Apr. 14, 2009

(65) Prior Publication Data

US 2010/0202285 A1 Aug. 12, 2010

Related U.S. Application Data

(60) Provisional application No. 61/151,063, filed on Feb. 9, 2009.

(51) Int. Cl.
*H04L 1/00* (2006.01)

(52) U.S. Cl.
USPC .......................................................... 370/238

(58) Field of Classification Search
USPC .......................................... 370/238; 709/241
See application file for complete search history.

(56) References Cited

U.S. PATENT DOCUMENTS

| | | | | |
|---|---|---|---|---|
| 5,291,550 A * | 3/1994 | Levy et al. | ..................... | 379/242 |
| 6,331,986 B1 * | 12/2001 | Mitra et al. | ................... | 370/468 |
| 6,594,268 B1 * | 7/2003 | Aukia et al. | ................... | 370/400 |
| 2002/0198995 A1 * | 12/2002 | Liu et al. | ........................ | 709/226 |
| 2004/0205239 A1 * | 10/2004 | Doshi et al. | .................... | 709/241 |
| 2004/0221060 A1 * | 11/2004 | Alicherry et al. | ............. | 709/238 |
| 2005/0286704 A1 * | 12/2005 | Enzmann et al. | ........ | 379/221.01 |
| 2006/0146792 A1 * | 7/2006 | Ramachandran et al. | ..... | 370/352 |
| 2007/0025364 A1 * | 2/2007 | Kodialam et al. | ............. | 370/400 |
| 2007/0180141 A1 * | 8/2007 | Mallesan | ........................ | 709/239 |
| 2009/0252033 A1 * | 10/2009 | Ramakrishnan et al. | ...... | 370/228 |
| 2010/0266279 A1 * | 10/2010 | Sadananda | ........................ | 398/48 |
| 2010/0284388 A1 * | 11/2010 | Fantini et al. | .................. | 370/338 |

* cited by examiner

*Primary Examiner* — Mark Rinehart
*Assistant Examiner* — Christopher R Crompton

(57) ABSTRACT

An algorithm is presented, which may be used to generate LSPs for path-oriented virtual circuit networks. The algorithm maximizes throughput of traffic-flow through the network according to certain constraints which may selected to suit various scenarios and recovery schemes. The algorithm may be used by network operators to maximize financial profit from existing networks which has a predetermined bandwidth capacity.

27 Claims, 2 Drawing Sheets

METHOD AND SYSTEM OF RESTORING FLOW OF TRAFFIC THROUGH NETWORKS

CROSS REFERENCE TO RELATED APPLICATION

The present invention is based upon and claims the benefit of the filing date of commonly assigned U.S. Provisional Patent Application Ser. No. 61/151,063, filed Feb. 9, 2009, which is incorporated herein by reference in its entirety.

FIELD OF THE INVENTION

The present invention relates to mechanisms for restoring flow of traffic through networks after failure. More specifically, the invention relates to an algorithm for establishing backup LSPs which aims to maximize the throughput of the network.

BACKGROUND OF THE INVENTION

Internet Protocol (IP) networks need to support real-time applications that require stringent availability and reliability, such as Voice over IP and virtual private networks. Networks are made up of a plurality of nodes connected by links. If any one node or link fails, network traffic needs to be rerouted along alternative paths through the network. Failures are common in the daily operation of networks, for reasons such as improper configuration, faulty interfaces, accidental fiber cuts and the like. Therefore, mechanisms that restore the flow of traffic quickly and efficiently after a failure are essential.

In restoration mechanisms using typical IP routing protocols, a node first detects a failure and then disseminates routing updates to other nodes. These updates are used for calculating new paths. This process may take several seconds before proper routing of data can resume. During this time, packets destined to some destinations may be dropped, and applications might be disrupted. Moreover, when Quality of Service (QoS) is supported, the routing protocol cannot guarantee that the alternate path will provide the same QoS as the failed one. Thus IP routing protocols are not suitable for fast restoration.

Consequently, network operators often employ recovery mechanisms in protocols such as WDM, SONET/SDH, and MPLS. These additional recovery mechanisms may provide fast restoration and high QoS assurance by establishing backup paths in advance, before a failure event takes place. Such recovery mechanisms are usually referred to as "protection" mechanisms, as opposed to "rerouting" mechanisms, which establish backup paths only after a failure occurs.

Prior art mechanisms for selecting optimal backup paths typically aim to minimize the total bandwidth reserved for the backup paths. To this end, backup paths are routed in such a way as to maximize their bandwidth sharing. This optimization metric is usually referred to as Spare Capacity Allocation (SCA).

Models that seek to optimize SCA usually consider a network whose links have unbounded capacity, and a cost function associated with bandwidth usage. In SCA optimization the cost associated with an established LSP does not depend on the load imposed on the selected route. There is therefore no incentive for load balancing. Such unbounded capacity models are useful for network designers as they may be used to determine the required capacity of the network under design.

Unlike network designers, network operators often need to use pre-existing networks with given capacities. Typically, the network operator seeks to maximize revenue by maximizing the traffic carried by a given network with finite link capacities. SCA optimization is not suited to such scenarios. The need remains, therefore, for a mechanism for quickly and efficiently restoring the flow of traffic after failure in fixed capacity networks. The present invention addresses this need.

SUMMARY OF THE INVENTION

Embodiments of the current invention are directed to providing a method for optimizing the routing of a plurality of traffic-flow elements f transversing a network, wherein, said method comprises the steps of: a) obtaining a profit value of for each traffic flow element representing the expected financial gain associated with routing said traffic flow; and b) applying an algorithm for routing each said traffic flow element while maximizing the total gained profit.

It is according to some embodiments of the invention that the network comprises a plurality of nodes connected by a plurality of internodal links, wherein:
each said link e is characterized by a bandwidth capacity ue, and
each said traffic-flow element f is characterized by a source-node, a destination-node and a bandwidth requirement df, and, wherein, said algorithm comprises maximizing the value of $$\sum_f w_f \cdot x_f$$

where xf is the total routed fraction of the full bandwidth requirement df subject to restraints. Typically, the restraints are selected to ensure that: traffic flow is conserved, no link carries more than its capacity, no flow is routed over a failed link, and the total routed bandwidth of each flow and the routed bandwidth on each backup LSP do not exceed flow demand.

Optionally the restraints are further selected to ensure that when no failure occurs, each flow is routed only along its primary LSP. Accordingly, the restraints may comprise:

$$y_{fe}^\phi = 0 \, \forall f \in F, \forall e \notin P_f$$

According to certain embodiments, the restraints comprise:

$$\sum_{e=(u,v)} y_{fe}^{\bar{e}} - \sum_{e=(v,u)} y_{fe}^{\bar{e}} = \begin{cases} x_f & v = t_f \\ -x_f & v = s_f \\ 0 & \text{else} \end{cases} \forall v \in V, \forall f = \forall \bar{e} \in \{E, \phi\}$$

$$\sum_f d_f \cdot y_{fe}^{\bar{e}} \leq u_e \quad \forall e \in E, \forall \bar{e} \in \{E, \phi\}$$

$$y_{fe}^e = 0 \quad \forall f \in f, \forall \bar{e} \in E$$

$$0 \leq x_f \leq 1, 0 \leq y_{fe}^{\bar{e}} \leq 1 \quad \forall e \in E, \forall \bar{e} \in \{E, \phi\}, \forall f \in F$$

Alternatively or additionally the restraints comprise:

$$\sum_{e=(u,v)} y_{fe}^{\bar{v}} - \sum_{e=(v,u)} y_{fe}^{\bar{v}} = \begin{cases} x_f & v = t_f \\ -x_f & v = s_f \\ 0 & \text{else} \end{cases} \begin{array}{l} \forall v \in V, \forall f = F, \\ \forall \bar{v} \in \{V, \phi\} \end{array}$$

-continued $$\sum_f d_f \cdot y_{fe}^{\bar{v}} \leq u_e \quad \forall\, e \in E, \forall\, \bar{v} \in \{V, \phi\}$$

$$y_{fe}^{\bar{v}} = 0 \quad \forall\, f \in f, \forall\, \bar{v} \in V, e \text{ incident to } \bar{v}$$

$$0 \leq x_f \leq 1,\, 0 \leq y_{fe}^{\bar{v}} \leq 1 \quad \forall\, e \in E, \forall\, \bar{v} \in \{V, \phi\}, \forall\, f \in F$$

The algorithm may be applicable to a plurality of restoration schemes. These include: global recovery schemes, local recovery schemes, restricted local recovery schemes, extended k facilitated local recovery schemes and unrestricted recovery schemes The method of claim 1, wherein, a primary LSP is provided for each traffic element and said algorithm establishes backup LSPs.

Accordingly, the restraints may further comprise at least one of the following:

$$y_{fe}^{\bar{e}} \geq y_{fe}^{\phi} \quad \forall\, f \in F, \forall\, \bar{e} \in E,$$

$$\{e \mid e \in E,\, e \neq \bar{e},\, \text{and } e \text{ is not a downstream link of } \bar{e} \text{ along } P_f\}$$

$$y_{fe}^{\bar{e}} \geq y_{fe}^{\phi} \quad \forall\, f \in F, \forall\, \bar{e} \in E, \{e \mid e \in E, \neq \bar{e}\}$$

$$y_{fe}^{\bar{e}} \begin{cases} = 0 & \forall\, \bar{e} \in E, \{f \mid f \in F, \bar{e} \in P_f\},\, e \in P_f \\ \geq y_{fe}^{\phi} & \text{otherwise} \end{cases}$$

$$y_{fe}^{\bar{e}} - y_{fe}^{\phi} = \Delta y_{fe}^{\bar{e}} \quad \forall\, f \in F, \forall\, \bar{e}, e \in E$$

$$\Delta y_{fe}^{\bar{e}_1} = \Delta y_{fe}^{\bar{e}_2} \quad \forall\, f \in F, \forall\, \bar{e}_1, \bar{e}_2 \in P_f$$

where $\bar{e}_2$ immediately follows $\bar{e}_1$ on $P_f$, $\forall\, e \in E$ $$y_{fe}^{\bar{e}} \geq y_{fe}^{\phi} \quad \forall\, \bar{e}, e \in E, \forall\, f, \bar{e} \notin P_f$$

$$y_{fe}^{\bar{v}} \geq y_{fe}^{\phi} \quad \forall\, f \in F, \forall\, \bar{v} \in V,$$

$$\{e \mid e \in E, e \neq \bar{e}, \text{ and } e \text{ is not a downstream}$$

of the upstream neighbor of $\bar{v}$ along $P_f\}$ $$y_{fe}^{\bar{v}} \geq y_{fe}^{\phi} \quad \forall\, f \in F, \forall\, \bar{v} \in V, \{e \mid e \in E, e \text{ is not incident to } \bar{v}\}$$

$$y_{fe}^{\bar{v}} \begin{cases} = 0 & \forall\, \bar{v} \in V, \{f \mid f \in F, \bar{v} \in P_f\},\, e \in P_f \\ \geq y_{fe}^{\phi} & \text{otherwise} \end{cases}$$

$$y_{fe}^{\bar{v}} - y_{fe}^{\phi} = \Delta y_{fe}^{\bar{v}} \quad \forall\, f \in F, \forall\, \bar{v} \in V, \forall\, e \in E$$

$$\Delta y_{fe}^{\bar{v}_1} = \Delta y_{fe}^{\bar{v}_2} \quad \forall\, f \in F, \forall\, \bar{v}_1, \bar{v}_2 \in P_f$$

where $\bar{v}_2$ immediately follows $\bar{v}_1$ on $P_f$, $\forall\, e \in E$ $$y_{fe}^{\bar{v}} \geq y_{fe}^{\phi} \quad \forall\, \bar{v} \in V, \forall\, e \in E, \forall\, f \in F, \bar{v} \notin P_f$$

In other embodiments the algorithm is applicable to establish LSPs in lightpaths. Accordingly, the algorithm may be subject to the following restraints:

$$\sum_i y_{fe}^{i\bar{e}} = y_{fe}^{\bar{e}} \quad \forall\, f \in F, \forall\, \bar{e}, e \in E$$

$$y_{fe_1}^{i\bar{e}} = y_{fe_2}^{\bar{e}} \quad \forall\, f \in F, \forall\, \bar{e} \in E, \forall\, i, \forall\, e_1, e_2 \in l_i$$

$$y_{fe}^{i\bar{e}} = 0 \quad \forall\, f \in F, \forall\, \bar{e} \in E, \forall\, i, \forall\, e \notin l_i$$

Optionally, the algorithm establishes primary and backup LSPs for each traffic element. The traffic flow may be splittable or not splittable.

Typically, the algorithm is a linear program and the algorithm may be a polynomial-time algorithm.

The abbreviation 'LSP' is used herein to refer to a Label Switched Path, which is an established route in an path-oriented domain such as MPLS or other virtual circuit network.

The abbreviation 'GR' is used herein to refer to Global Recovery, which is one of the recovery schemes supported by embodiments of the present invention.

The abbreviation 'LR' is used herein to refer to a Local Recovery, which is another recovery schemes supported by embodiments of the present invention.

The abbreviation 'RLR' is used herein to refer to a Restricted Local Recovery, which is another of the recovery schemes supported by embodiments of the present invention.

The abbreviation 'EkFLR' is used herein to refer to an Extended k Facilitated Local Recovery, which is one of the recovery schemes supported by embodiments of the present invention.

The abbreviation 'UR' is used herein to refer to Unrestricted Recovery, which is one of the recovery schemes supported by embodiments of the present invention.

The abbreviation 'SCA' is used herein to refer to Spare Capacity Allocation, a widely used optimization metric for restorable traffic.

The abbreviation 'S-PRFP' is used herein to refer to Splittable Primary-restricted Restorable Flow Problem, an optimization problem solved by embodiments of the present invention.

The abbreviation 'S-RFP' is used herein to refer to Splittable Restorable Flow Problem, a further optimization problem solved by embodiments of the present invention.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DESCRIPTION OF THE PREFERRED EMBODIMENTS

Embodiments of the current invention are directed to providing an optimal polynomial time optimization routing algorithm for providing Label Switch Paths (LSPs) for routing traffic flow through IP networks having predetermined bandwidth limitations. The routing algorithm aims to maximize the financial profit gained by routing the traffic flow.

Prior art algorithms, typically based upon spare capacity allocation (SCA), which aim to minimize total bandwidth requirements, are best suited to designing new networks and are not ideal when dealing with networks which have finite resources. Network operators are faced with the task of maximizing profit given a preexisting network. In contradistinction to prior art algorithms, the routing algorithms used in embodiments of the current invention aim to maximize throughput of a finite network, thereby maximizing potential financial profit.

Figure 1A:
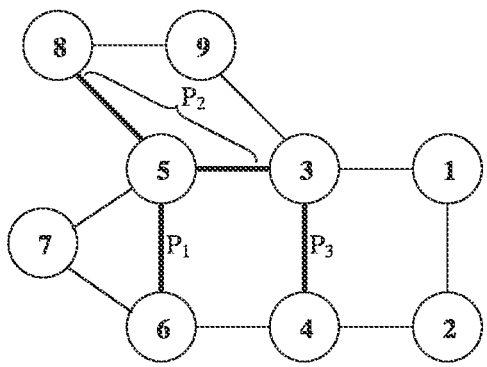
FIG. 1 is an illustration of a simple network illustrating a limitation of SCA optimization.

Reference is now made to FIG. 1A showing a simple network consisting of nine nodes (1-9) connected by twelve links. Traffic flow elements are characterized by a source node and a destination node, for example, one traffic flow f1=(5, 6) starts at node 5 and terminates at node 4. The LSP is the route allocated from the source node to the destination node.

In keeping with standard terminology, the path that carries the traffic before a failure is referred to as a primary LSP, and the path that carries the traffic after the primary LSP fails is referred to as a backup LSP. It is noted that for bandwidth guaranteed protection, the backup LSP must be able to provide the same amount of guaranteed bandwidth provided by the primary LSP. To this end, resources may be reserved upon the establishment of each backup LSP, to be used only when the protected element, link or node, fails.

Suppose that the capacity of each link in the network of FIG. 1A is equal to one unit of bandwidth and each link has a running cost of one monetary unit. Suppose also that the network has three traffic-flow elements: f1=(5, 6), f2=(3, 8), and f3=(3, 4), each requesting one unit of bandwidth. Primary LSPs of the three flows may be routed on their corresponding shortest paths, namely for f1 along the link 5-6, for f2 along the link 3-5 and then along the link 5-8, and for f3 along the link 3-4. Thus, the primary LSP P1 for f1 may be represented [5-6], the primary LSP P2 for f2 is represented [3-5-8] and the primary LSP P3 for f3 may be represented [3-4]. It will be apparent that due to topology constraints the backup LSP P1' of f1 is [5-7-6] and the backup LSP P2' of f2 is [3-9-8] passing through nodes 7 and 9, respectively.

Figure 1B:
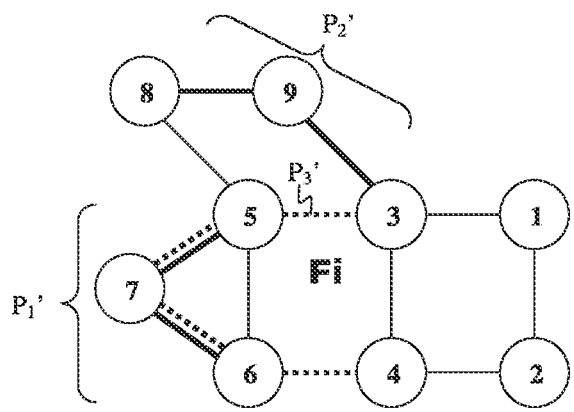
Figure 1C:
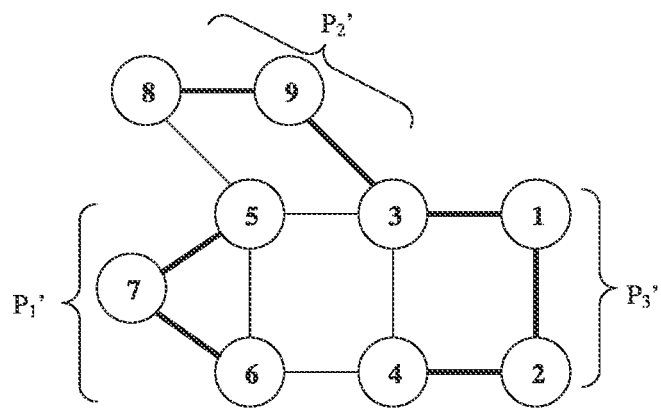

The difference between routing solutions aiming to minimize bandwidth requirements and those aiming to maximize throughput may demonstrated by comparing the FIG. 1B with FIG. 1C.

As shown in FIG. 1B, routing that optimizes the SCA metric will maximize bandwidth sharing. In order to do so the backup LSP P3' of flow f3 will be routed on path [3-5-7-6-4] rather than on the shorter path [3-1-2-4]. The former path is chosen since the backup LSP can share the bandwidth of links 5-7 and 7-6 with the backup LSP of f1. Thus, the added cost of this path is only two units of bandwidth (links 3-5 and 6-4), whereas the shorter alternative incurs a cost of three units of bandwidth (links 3-1, 1-2 and 2-4). However, the capacity of the link 3-5 is fixed at one unit of bandwidth. Therefore, the SCA routing is not feasible as the capacity constraint of link 3-5 is violated. Hence, if SCA routing is used, one of the flows f2 and f3 must be rejected.

As shown in FIG. 1C, however, if our goal is not to minimize SCA but rather to maximize throughput, we would route the backup LSP of f3 through the underutilized path [3-1-2-4]. Thus all the three flows may be admitted. Thus throughput maximization may be preferred to SCA by network operators.

Two types of event failures can be considered: a link failure and a node failure. The embodiments of the routing algorithm described hereinbelow are described in terms of link failures which account for about 70% of the total network failures. Nevertheless, it will be apparent that other embodiments of the algorithm may be modified to account for node failures.

According to some embodiments of the invention, the primary LSPs are predetermined and only the backup LSPs need be established by the algorithm. Alternatively, other embodiments of the algorithm may establish the primary LSPs and the backup LSPs. The former case in which primary LSPs are given and only backup LSPs must be established is referred to as the Primary Restricted Restorable Flow Problem (PRFP). The latter scenario in which primary and backup LSPs need be established is referred to as the Restorable Flow Problem (RFP).

Optionally, in some embodiments a traffic-flow element may be divided to travel along more than one LSP, known as the splittable variants. Alternatively, the traffic-flow element may be constrained to travel along only one LSP, known as unsplittable variants.

It is a particular feature of embodiments of the current invention that the routing algorithm supports a variety of restoration schemes currently utilized in known protection mechanisms. For illustration purposes only, embodiments are described relating to Multiprotocol Label Switching (MPLS) protection mechanisms, it will be appreciated, however, that other embodiments of the invention may be applied to other protection mechanisms.

Reference is now made to FIGS. 2A-F, showing schematic representations of various known MPLS recovery schemes.

Figure 2A:
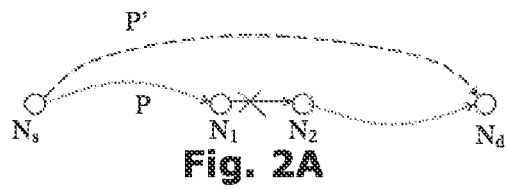
FIGS. 2A-F are schematic representations illustrating various recovery schemes.

With particular reference to FIG. 2A, a Global Recovery (GR) scheme is represented. In this class of recovery scheme, each primary LSP P has one backup LSP P'. The primary LSP P and backup LSP P' both start at the source node Ns and terminate at the destination node Nd. The backup LSP P' protects against all link/node failures along the primary LSP P, and it does not share any link/node with the primary LSP P. A failure notification must propagate from the node that detects the failure to the source node Ns. These recovery schemes are sometimes referred to as path recovery schemes.

Figure 2B:
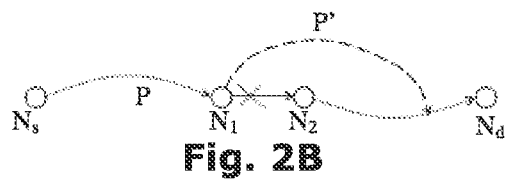

Referring now to FIG. 2B, a Local Recovery (LR) scheme is represented. In this class, a separate backup LSP P' is constructed to protect against a possible failure of each element along the primary LSP P. Each backup LSP P' starts at the immediate upstream node N1 of the protected element, and ends at the tail T of the primary LSP P. If such a local path does not exist, we assume that the LSP starts at the closest possible upstream node. A backup LSP P' may share links with the primary LSP P upstream of the failure.

Note that recovery in the LR class is faster than in the GR class, since the node that detects the failure is usually also the one that diverts the traffic to the backup LSP. However, more backup LSPs are needed to protect each primary LSP.

Figure 2C:
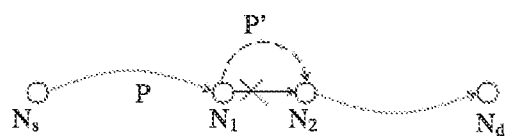

Referring now to FIG. 2C, a Restricted Local Recovery (RLR) scheme is represented. As in the LR scheme, a backup LSP P' starts at the immediate upstream node N1 of the protected element but ends at the immediate downstream node N2. This makes the recovery process more local, since the route downstream of the failure does not change. Hence, unlike in the LR scheme, resources need not be released downstream of the primary LSP failure. The RLR schemes are sometimes referred to as link recovery schemes.

Figure 2D:
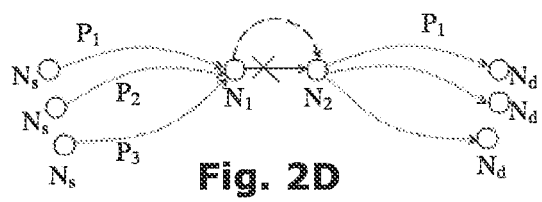

With reference to FIG. 2D, a Facility Local Recovery (FLR) scheme is represented. Here a backup LSP P' is constructed as in the RLR schemes, however a single backup LSP P' protects all the primary LSPs P1-3 that traverse the protected element.

It will be appreciated that this class of recovery scheme is particularly suited to restoring the traffic to the backup LSP using MPLS label stacking. In addition, with this recovery scheme, the number of backup LSPs and the incurred state overhead are significantly reduced.

Figure 2E:
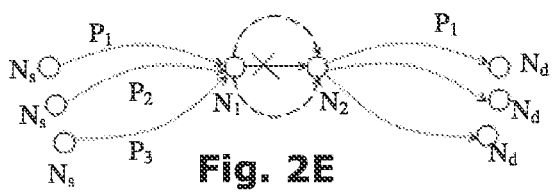

Referring now to FIG. 2E, an Extended k-Facility Local Recovery (EkFLR) scheme is represented. Again, the backup LSPs P' are constructed as in RLR, here however, there might be up to k backup LSPs P' that protect each element. This scheme is more flexible than FLR, and permits the preferred trade-off between higher routing efficiency (k is larger) and lower administration overhead (k is smaller).

Figure 2F:
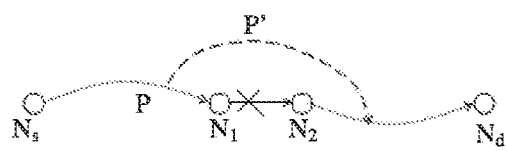

In FIG. 2F, the Unrestricted Recovery (UR) scheme is illustrated. In this class, each primary LSP P may be protected by any number of backup LSPs P'. Moreover, each backup LSP P' may start and end at any point along the primary LSP P, and may protect against failures of any number of elements. Although this scheme incurs the highest administrative overhead it is also the most flexible of all the schemes.

An exemplary embodiment of the invention involves a method for optimizing the routing of a plurality of traffic-flow elements f transversing a network. Typically, the network comprises a plurality of nodes connected by a plurality of internodal links where each link e has a characteristic bandwidth capacity ue. Each traffic-flow elements f are have a given and a bandwidth requirement df, The method includes the steps of: a) assigning a profit value wf to each traffic-flow element f, the profit value represents the expected financial gain associated with routing the associated traffic-flow element, and b) applying an algorithm for routing each traffic-flow element while maximizing the total gained profit.

For the sake of simplicity, the algorithm is described hereinbelow with respect to the Splittable Primary-restricted Restorable Flow Problem (S-PRFP) and with only one primary LSP being established for each traffic-flow element. It will be appreciated that the algorithm is extendable to cases in which every traffic-flow element has several primary LSPs.

Let G=(V,E) be a directed graph. Let ue be the bandwidth capacity of link e which is an element of the set E. Let F which is a subset of V×V be a set of source-destination pairs representing traffic-flow demands. For every traffic-flow element f=(sf, tf) which is a member of the set F, sf is the source node, tf is the target node, df is the bandwidth demand, Pf is the sequence of links along the primary LSP, and wf is the financial profit associated with providing f.

A feasible solution is considered to be a solution which admits some of the traffic-flow elements into the network while meeting the preexisting link capacity constraints. Each admitted flow is routed on its primary LSP and must be fully restorable in the face of any single link failure.

Hence, for every admitted flow f and link e along the primary LSP, there must exist a set of backup LSPs that satisfies the constraints of a predetermined recovery scheme and can accommodate the admitted traffic of f when link e fails.

It is a particular feature of embodiments of the present invention that the algorithm's objective is to maximize the total profit of the admitted traffic flows.

It is further noted that although the backup LSPs must fully restore the admitted traffic for any single failure, the traffic demand of each admitted flow may not be fully satisfied. Moreover, following a failure, the admitted traffic of a flow may be divided between a plurality of backup LSPs. The splittable version of the problem is therefore more applicable to the case where the network can split each flow into smaller sub-flows. A good example of a splittable traffic flow is a Voice over IP (VoIP) trunk between two media gateways. Such a trunk should carry thousands of low bandwidth VoIP calls at any given time. Hence, when necessary, the flow carried by this trunk can be divided into smaller sub-flows, each carrying only a portion of the traffic.

Allowing multiple LSPs to back up a single primary LSP is especially attractive when no single backup LSP can accommodate the entire flow demand. However, it is noted that multiple backup LSPs may require greater signaling and state overhead.

The algorithm aims to maximize the value of $$\sum_f w_f \cdot x_f$$

where wf is the assigned profit value of the traffic flow and xf is the total routed fraction of the full bandwidth requirement df. The maximization is subject to certain restraints as outlined below.

A first restraint, which is applied to ensure that traffic flow is conserved, may be represented as:

$$\sum_{e=(u,v)} y_{fe}^{\bar{e}} - \sum_{e=(v,u)} y_{fe}^{\bar{e}} = \begin{cases} x_f & v = t_f \\ -x_f & v = s_f \\ 0 & \text{else} \end{cases}$$

$$\forall v \in V, \forall f \in F, \forall \bar{e} \in \{E, \phi\}$$

where $y_{fe}^{\bar{e}}$ is the fraction of df routed over a link e when link $\bar{e}$ fails, note also that where no link fails $\bar{e}=\phi$.

A second restraint, which ensures that no link carries more than its capacity, is given by:

$$\sum_f d_f \cdot y_{fe}^{\bar{e}} \leq u_e \ \forall e \in E, \forall \bar{e} \in \{E, \phi\}$$

A third restraint, which ensures that when no failure occurs, each flow is routed only along its primary LSP, is given by:

$$y_{fe}^{\phi}=0 \ \forall f \in F, \forall e \notin P_f$$

A fourth restraint, which ensures that no flow is routed over a failed link, is given by:

$$y_{fe}^{e}=0 \ \forall f \in F, \forall e \in E$$

A fifth restraint, which ensures that the total routed bandwidth of each flow and the routed bandwidth on each backup LSP do not exceed flow demand, is given by:

$$0 \leq x_f \leq 1, 0 \leq y_{fe}^{\bar{e}} \leq 1 \ \forall e \in E, \forall \bar{e} \in \{E, \phi\}, \forall f \in F$$

It is noted that these first five constraints do not restrict the backup LSPs to be built according to a specific recovery scheme. Instead the algorithm generates, for every routed flow and for every failed link, a set of backup LSPs that can carry the flow's demand following a failure. Indeed, by applying only these constraints, a flow may be diverted to a set of backup LSPs even if it is not routed through the failed edge. In fact, the above linear program solves |E| different instances of the splittable flow problem, one for each failed link. The only connection between these |E| instances is the requirement that the routed demand of each flow in every instance must be the same (i.e., $x_f$). Such a "recovery scheme," which has almost no restriction, may be the most flexible available.

Nevertheless, the algorithm may be applied to each one of the recovery schemes presented above by imposing additional and alternative constraints upon the backup LSPs.

The set of constraints for the LR scheme ensures that, as long as the failed link $\bar{e}$ is one of the links along the primary LSP, the backup LSP off for $\bar{e}=(u, v)$ will follow the primary LSP all the way from the source to u. Thus from node v to the destination node, the backup LSP is not constrained. The LR restraint may be represented as:

$$y_{fe}^{\bar{e}} \geq y_{fe}^{\phi} \forall f \in F, \forall e \in E,$$

$\{e | e \in E, e \neq \bar{e}$, and $e$ is not a downstream link of $\bar{e}$ along $P_f\}$ The set of constraints for the RLR differs from the LR restraint in that it also ensures that if a backup LSP protects against a failure of a link $\bar{e}=(u, v)$, it will follow the primary LSP not only from the source to u but also from v to the destination. Thus the RLR restraint may be represented as:

$$y_{fe}^{\bar{e}} \geq y_{fe}^{\phi} \forall f \in F, \forall \bar{e} \in E, \{e | e \in E, e \neq \bar{e}\}$$

Since S-PRFP allows the traffic of the failed primary LSP to be split between several backup LSPs, RLR may use an unbounded number of backup LSPs for each link failure. Hence, an optimal solution for the FLR scheme and for the EkFLR scheme may be obtained by an optimal solution for the RLR scheme. Therefore, there is no need to specify special constraints for these two recovery schemes.

Regarding the GR scheme, a first GR-constraint is provided to ensure that the backup LSPs of every flow whose primary LSP which crosses the failed link must be link disjoint with the primary LSP. The first GR-constraint is:

$$y_{fe}^{\bar{e}} \begin{cases} = 0 & \forall \bar{e} \in E, \{f \mid f \in F, \bar{e} \in P_f\}, e \in P_f \\ \geq y_{fe}^{\phi} & \text{otherwise} \end{cases}$$

A second GR-constraint introduces auxiliary variables $\Delta y_{fe}^{\bar{e}}$. Each of these variables represents the difference between the bandwidth off routed on the primary LSP, and the bandwidth of f to be routed on the backup LSPs that protect the flow against the failure of link $\bar{e}$. This difference yields a circular traffic flow that traverses the backup LSPs from the source to the destination and the primary LSP in the reverse direction. The second GR-constraint may therefore be given as:

$$y_{fe}^{\bar{e}} - y_{fe}^{\phi} = \Delta y_{fe}^{\bar{e}} \forall f \in F, \forall \bar{e}, e \in E$$

A third GR-constraint ensures that for each traffic-flow element, the same set of backup LSPs is used to protect all the links along the primary LSP. The third GR-constraint may therefore be given as:

$$\Delta y_{fe}^{\bar{e}_1} = \Delta y_{fe}^{\bar{e}_2} \forall f \in F, \forall \bar{e}_1, \bar{e}_2 \in P_f$$

where $\bar{e}_2$ immediately follows $\bar{e}_1$ on $P_f, \forall e \in E$

The set of specific constraints for the UR scheme ensures that if the failed link is not included in the primary LSP of a traffic-flow element, then the backup LSP is identical to the primary LSP. Otherwise, the set of backup LSPs has no constraint. The UR-constraint may be presented as:

$$y_{fe}^{\bar{e}} \geq \Delta y_{fe}^{\phi} \forall \bar{e}, e \in E, \forall f \in F, \bar{e} \notin P_f$$

The above described algorithm is suited to the Splittable Primary-restricted Restorable Flow Problem. Other embodiments may extend the algorithm to the Splittable Restorable Flow Problem (S-RFP), in which the problem is to establish not only the backup, but also the Primary LSPs. S-RFP can split the traffic over several primary LSPs. Every link along these LSPs can be protected by several backup LSPs. The demand of every traffic-flow element may be partially satisfied, in which case only part of the profit is obtained.

Typically, the linear program constraints for S-PRFP with RLR, FLR and EkFLR do not depend on the primary LSPs.

Thus, we can use this linear program for S-RFP without the third set of constraints that restricts the flow to the primary LSP where no failure occurs. Hence, S-RFP with RLR, FLR and EkFLR can be solved in polynomial time.

To formulate the S-RFP using the other recovery schemes (GR, LR, and UR) path-indexed variables may be used, namely variables that indicate for each flow the routed bandwidth on every possible path in the graph.

Other embodiments of the invention, the linear program may be extended to MPLS over Wavelength-Division Multiplexing (WDM) lightpaths. It is a feature of WDM lightpaths that when a flow enters a lightpath, it can leave it only at the lightpath's egress node. Hence, a failure of a link will fail all lightpaths traversing it. The algorithm may be applied to WDM scenario by applying the following three further constraints.

The first WDM constraint ensures that the sum of the traffic carried over all the lightpaths on a certain link is equal to the total traffic traversing this link. The first WDM-constraint may be presented as;

$$\sum_i y_{fe}^{i\bar{e}} = y_{fe}^{\bar{e}} \; \forall f \in F, \forall \bar{e}, e \in E$$

where $l_i$ denotes the set of (physical) links composing lightpath i, and $y_{fe}^{i\bar{e}}$ denotes the part of $y_{fe}^{\bar{e}}$ traffic that traverses lightpath i.

The second WDM constraint ensures that the amount of traffic carried by a lightpath is equal on all the links composing this lightpath. This constraint is given as:

$$y_{fe_1}^{i\bar{e}} = y_{fe_2}^{i\bar{e}} \forall f \in F, \forall \bar{e} \in E, \forall i, \forall e_1, e_2 \in l_i$$

The third WDM constraint ensures that no traffic traversing a lightpath is carried over links that are not included in that lightpath. This constraint may be represented as:

$$y_{fe}^{i\bar{e}} = 0 \forall f \in F, \forall \bar{e} \in E, \forall i, \forall e \notin l_i$$

In still further embodiments of the invention extend the algorithm to relate to node failures. A node failure differs from link failure in that it causes the failure of all links connected to it. Thus the failure of a single node may cause the failure of two links along an LSP. The algorithm still aims to maximize the value of $$\sum_f w_f \cdot x_f$$

however the constraints may be modified according to suit the case of node failure.

The first restraint of the node-failure scenario, ensuring traffic flow conservation is modified to:

$$\sum_{e=(u,v)} y_{fe}^{\bar{v}} - \sum_{e=(v,u)} y_{fe}^{\bar{v}} = \begin{cases} x_f & v = t_f \\ -x_f & v = s_f \\ 0 & \text{else} \end{cases}$$

$$\forall v \in V, \forall f \in F, \forall \bar{v} \in \{V, \phi\}$$

where $y_{fe}^{\bar{v}}$ is the fraction of $d_f$ routed over a link e when node $\bar{v}$ fails, note also that where no link fails $\bar{v}=\phi$.

The second restraint of the node-failure scenario, ensuring that no link carries more than its capacity, is modified to:

$$\sum_f d_f \cdot y_{fe}^v \leq u_e \ \forall \ e \in E, \forall \ \bar{v} \in \{V, \phi\}$$

The third restraint of the node-failure scenario, ensuring that when no failure occurs, each flow is routed only along its primary LSP, remains:

$$y_{fe}^\phi = 0 \ \forall f \in F, \forall e \notin P_f$$

The fourth restraint of the node-failure scenario, ensuring that no flow is routed over a link incident to a failed node, is modified to:

$$y_{fe}^{\bar{v}} = 0 \ \forall f \in F, \forall \bar{v} \in V, e \text{ incident to } \bar{v}$$

The fifth restraint of the node-failure scenario, ensuring that the total routed bandwidth of each flow and the routed bandwidth on each backup LSP do not exceed flow demand, is modified to:

$$0 \leq x_f \leq 1, 0 \leq y_{fe}^{\bar{v}} \leq 1 \ \forall e \in E, \forall \bar{v} \in \{V, \phi\}, \forall f \in F$$

Node-failure modifications may be applied to the constraints applied for the various restoration schemes. Thus the LR restraint is modified to:

$$y_{fe}^{\bar{v}} \geq y_{fe}^\phi \forall f \in F, \forall \bar{v} \in V,$$

$\{e | e \in E, e \neq \bar{e}, \text{ and } e \text{ is not downstream of the upstream neighbor of } \bar{v} \text{ along } P_f\}$ The RLR restraint, in the node failure case, is modified to:

$$y_{fe}^{\bar{v}} \geq y_{fe}^\phi \forall f \in F, \forall \bar{v} \in V, \{e | e \in E, e \text{ is not incident to } \bar{v}\}$$

The three GR restraints, in the node failure case, are:

$$y_{fe}^{\bar{v}} \begin{cases} = 0 & \forall \bar{v} \in V, \{f \mid f \in F, \bar{v} \in P_f\} e \in P_f \\ \geq y_{fe}^\phi & \text{otherwise} \end{cases}$$

$$y_{fe}^{\bar{v}} - y_{fe}^\phi = \Delta y_{fe}^{\bar{v}} \ \forall f \in F, \forall \bar{v} \in V, \forall e \in E$$

$$\Delta y_{fe}^{\bar{v}_1} = \Delta y_{fe}^{\bar{v}_2} \ \forall f \in F, \forall \bar{v}_1, \bar{v}_2 \in P_f$$

where $\bar{v}_2$ immediately follows $\bar{v}_1$ on $P_f$, $\forall e \in E$

The UR restraints, in the node failure case is modified to:

$$y_{fe}^{\bar{v}} \geq y_{fe}^\phi \forall \bar{v} \in V, \forall e \in E, \forall f \in F, \bar{v} \notin P_f$$

Thus embodiments of the invention provide algorithms which may be used to generate LSPs for various path-oriented virtual circuit networks. The algorithm maximizes throughput of traffic-flow through the network according to constraints which may selected to suit various scenarios and recovery schemes. The algorithm may be used by network operators to maximize financial profit from existing networks having predetermined bandwidth capacity.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

What is claimed is:

1. A computerized method for optimizing the routing of a plurality of traffic-flow elements f traversing a network using a processor, wherein, said method comprises the steps of:

obtaining a profit value $w_f$ for each of a plurality of traffic flow elements f traversing a network having at least one of a plurality of source nodes and a plurality of destination nodes, representing the expected financial gain associated with routing of said traffic flow element and a plurality of link capacity constraints of the network;

calculating, using the processor and linear programming (LP), according to said profit value $w_f$ of at least some of said plurality of traffic flow elements f and said plurality of link capacity constraints, a predetermined recovery scheme having at least one backup network path for routing at least a group of said plurality of traffic flow elements while maximizing a total gained profit from said plurality of traffic flow elements before the routing of said plurality of traffic flow elements;

routing said plurality of traffic-flow elements in said network;

detecting at least one of a link failure and a node failure in said network; and changing the routing of said plurality of traffic-flow elements to routing according to said at least one backup network path of said predetermined recovery scheme in response to said detection.

2. The method of claim 1, wherein said network comprises a plurality of nodes connected by a plurality of internodal links, wherein:

each said internodal link e is characterized by a bandwidth capacity $u_e$, and each said traffic-flow element f is characterized by a source-node, a destination-node and a bandwidth requirement $d_f$, wherein, said calculating is based on maximizing the value of $$\sum_f w_f \cdot x_f$$

where $x_f$ is the total routed fraction of the full bandwidth requirement $d_f$ subject to restraints.

3. The method of claim 2, wherein said at least one backup network path is a label switch path (LSP); wherein said restraints are selected to ensure that:

traffic flow is conserved,
no link carries more than its capacity,
no flow is routed over a failed link, and
the total routed bandwidth of each flow and the routed bandwidth on each backup LSP do not exceed flow demand.

4. The method of claim 3, wherein said restraints are further selected to ensure that when no failure occurs, each flow is routed only along its primary LSP.

5. The method of claim 4, wherein said restraints further comprise:

$$y_{fe}^\phi = 0 \ \forall f \in F, \forall e \notin P_f.$$

6. The method of claim 3, wherein said restraints comprise:

$$\sum_{e=(u,v)} y_{fe}^{\bar{e}} - \sum_{e=(v,u)} y_{fe}^{\bar{e}} = \begin{cases} x_f & v = t_f \\ -x_f & v = s_f \\ 0 & \text{else} \end{cases}$$

$$\forall v \in V, \forall f \in F, \forall \bar{e} \in \{E, \phi\}$$

-continued $$\sum_f d_f \cdot y_{fe}^{\bar{e}} \leq u_e \ \forall \, e \in E, \ \forall \, \bar{e} \in \{E, \phi\}$$

$$y_{fe}^e = 0 \ \forall \, f \in F, \ \forall \, e \in E$$

$$0 \leq x_f \leq 1, \ 0 \leq y_{fe}^{\bar{e}} \leq 1 \ \forall \, e \in E, \ \forall \, \bar{e} \in \{E, \phi\}, \ \forall \, f \in F.$$

7. The method of claim 6, wherein said restraints further comprise:

$$y_{fe}^{\bar{e}} \geq y_{fe}^{\phi} \forall f \in F, \forall \bar{e} \in E,$$

$\{e | e \in E, e \neq \bar{e},$ and $e$ is not a downstream link of $\bar{e}$ along $P_f\}$.

8. The method of claim 6, wherein said restraints further comprise:

$$y_{fe}^{\bar{e}} \geq y_{fe}^{\phi} \forall f \in F, \forall \bar{e} \in E, \{e | e \in E, e \neq \bar{e}\}.$$

9. The method of claim 6, wherein said restraints further comprise:

$$y_{fe}^{\bar{e}} \begin{cases} = 0 & \forall \, \bar{e} \in E, \{f \mid f \in F, \bar{e} \in P_f\}, e \in P_f \\ \geq y_{fe}^{\phi} & \text{otherwise} \end{cases}$$

$$y_{fe}^{\bar{e}} - y_{fe}^{\phi} = \Delta y_{fe}^{\bar{e}} \ \forall \, f \in F, \ \forall \, \bar{e}, e \in E$$

$$\Delta y_{fe}^{\bar{e}_1} = \Delta y_{fe}^{\bar{e}_2} \ \forall \, f \in F, \ \forall \, \bar{e}_1, \bar{e}_2 \in P_f$$

where $\bar{e}_2$ immediately follows $\bar{e}_1$ on $P_f$, $\forall \, e \in E$.

10. The method of claim 6, wherein said restraints further comprise:

$$y_{fe}^{\bar{e}} \geq y_{fe}^{\phi} \forall \bar{e}, e \in E, \forall f \in F, \bar{e} \notin P_f.$$

11. The method of claim 3, wherein said restraints comprise:

$$\sum_{e=(u,v)} y_{fe}^{\bar{v}} - \sum_{e=(v,u)} y_{fe}^{\bar{v}} = \begin{cases} x_f & v = t_f \\ -x_f & v = s_f \\ 0 & \text{else} \end{cases}$$

$$\forall \, v \in V, \ \forall \, f \in F, \ \forall \, \bar{v} \in \{V, \phi\}$$

$$\sum_f d_f \cdot y_{fe}^{\bar{v}} \leq u_e \ \forall \, e \in E, \ \forall \, \bar{v} \in \{V, \phi\}$$

$$y_{fe}^{\bar{v}} = 0 \ \forall \, f \in F, \ \forall \, \bar{v} \in V, e \text{ incident to } \bar{v}$$

$$0 \leq x_f \leq 1, \ 0 \leq y_{fe}^{\bar{v}} \leq 1 \ \forall \, e \in E, \ \forall \, \bar{v} \in \{V, \phi\}, \ \forall \, f \in F.$$

12. The method of claim 11, wherein said restraints further comprise:

$$y_{fe}^{\bar{v}} \geq y_{fe}^{\phi} \forall f \in F, \forall \bar{v} \in V,$$

$\{e | e \in E, e \neq \bar{e},$ and $e$ is not downstream of the upstream neighbor of $\bar{v}$ along $P_f\}$.

13. The method of claim 11, wherein said restraints further comprise:

$$y_{fe}^{\bar{v}} \geq y_{fe}^{\phi} \forall f \in F, \forall \bar{v} \in V, \{e | e \in E, e \text{ is not incident } to \ \bar{v}\}.$$

14. The method of claim 11, wherein said restraints further comprise:

$$y_{fe}^{\bar{v}} \begin{cases} = 0 & \forall \, \bar{v} \in V, \{f \mid f \in F, \bar{v} \in P_f\}, e \in P_f \\ \geq y_{fe}^{\phi} & \text{otherwise} \end{cases}$$

$$y_{fe}^{\bar{v}} - y_{fe}^{\phi} = \Delta y_{fe}^{\bar{v}} \ \forall \, f \in F, \ \forall \, \bar{v} \in V, \ \forall \, e \in E$$

$$\Delta y_{fe}^{\bar{v}_1} = \Delta y_{fe}^{\bar{v}_2} \ \forall \, f \in F, \ \forall \, \bar{v}_1, \bar{v}_2 \in P_f$$

where $\bar{v}_2$ immediately follows $\bar{v}_1$ on $P_f$, $\forall \, e \in E$.

15. The method of claim 11, wherein said restraints further comprise:

$$y_{fe}^{\bar{v}} \geq y_{fe}^{\phi} \forall \bar{v} \in V, \forall e \in E, \forall f \in F, \bar{v} \notin P_f.$$

16. The method of claim 1, wherein said calculating is applicable to a plurality of predefined restoration schemes.

17. The method of claim 16, wherein said restoration schemes are selected from the group consisting of: global recovery schemes, local recovery schemes, restricted local recovery schemes, extended k facilitated local recovery schemes and unrestricted recovery schemes.

18. The method of claim 1, wherein said at least one backup network path comprises a primary label switch path (LSP) which is provided for each traffic element and said algorithm establishes backup LSPs.

19. The method of claim 1, wherein said at least one backup network path is used to establish label switch paths (LSPs) in lightpaths.

20. The method of claim 19, wherein said calculating is subject to the following restraints:

$$\sum_i y_{fe}^{i\bar{e}} = y_{fe}^{\bar{e}} \ \forall \, f \in F, \ \forall \, \bar{e}, e \in E$$

$$y_{fe_1}^{i\bar{e}} = y_{fe_2}^{i\bar{e}} \ \forall \, f \in F, \ \forall \, \bar{e} \in E, \ \forall \, i, \ \forall \, e_1, e_2 \in l_i$$

$$y_{fe}^{i\bar{e}} = 0 \ \forall \, f \in F, \ \forall \, \bar{e} \in E, \ \forall \, i, \ \forall \, e \notin l_i.$$

21. The method of claim 1, wherein said calculating comprises calculating primary and backup label switch paths (LSPs) for each traffic element.

22. The method of claim 1, wherein said ac-flow elements are splittable.

23. The method of claim 1, wherein said traffic-flow elements are not splittable.

24. The method of claim 1, wherein said calculating is performed using an optimal polynomial-time algorithm.

25. The method of claim 1, wherein said maximizing is performed by at least one of selecting said group so that it consists only some of said plurality of traffic flow elements and defining a bandwidth limitation for at least one traffic flow element of said at least some traffic flow elements.

26. The method of claim 1, wherein network having both said plurality of source nodes and said plurality of destination nodes.

27. The method of claim 1, wherein said maximizing comprises obtaining an optimal solution maximizing said total gained profit from said plurality of traffic flow elements.

* * * * *